(No Model.)

I. HAMILTON.
MACHINE FOR MAKING LADLES.

No. 376,377. Patented Jan. 10, 1888.

Witnesses.
L. T. Gardner
Edw. P. Ellis.

Inventor.
I. Hamilton,
per F. A. Lehmann,
atty.

UNITED STATES PATENT OFFICE.

ISAAC HAMILTON, OF DENNING, NEW YORK.

MACHINE FOR MAKING LADLES.

SPECIFICATION forming part of Letters Patent No. 376,377, dated January 10, 1888.

Application filed July 11, 1887. Serial No. 244,013. (No model.)

*To all whom it may concern:*

Be it known that I, ISAAC HAMILTON, of Denning, in the county of Ulster and State of New York, have invented certain new and useful Improvements in Machines for Making Ladles; and I do hereby declare the following to be a full, clear, and exact description of the invention, such as will enable others skilled in the art to which it pertains to make and use it, reference being had to the accompanying drawings, which form part of this specification.

My invention relates to an improvement in machines for making ladles, which is intended only for forming the inside of the bowl and the top side of the handle; and it consists in the combination of a cutter-head, which is placed upon the end of a shaft and provided with two knives or cutters, one of which cuts the inside of the bowl of the ladle and the other the top side of the handle, and a carriage arranged in suitable relation to the cutter-head, in which the block from which the ladle is to be formed is secured, all of which will be more fully described hereinafter.

The object of my invention is to provide a machine which will form the inside of the bowl of a ladle and the top side of the handle at one operation, requiring only to be polished to complete it.

Figure 1:
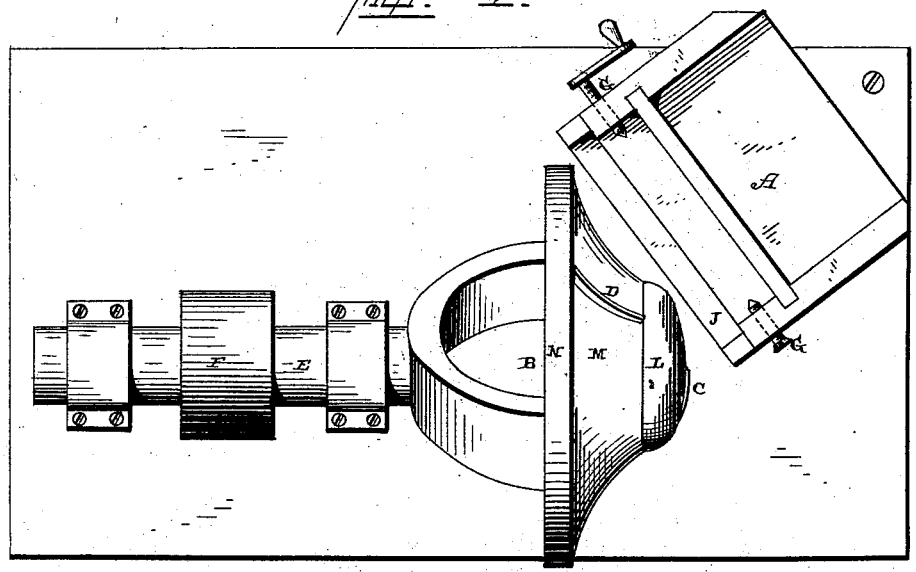
Figures 2, 4, 5:
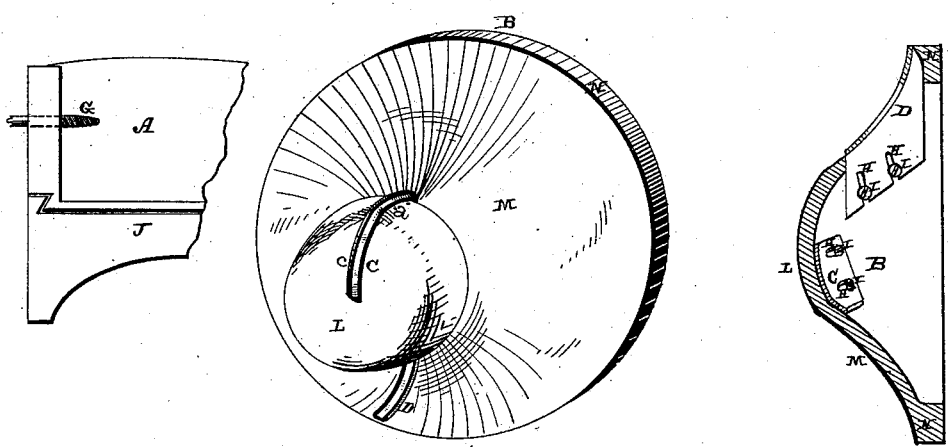
Figure 3:
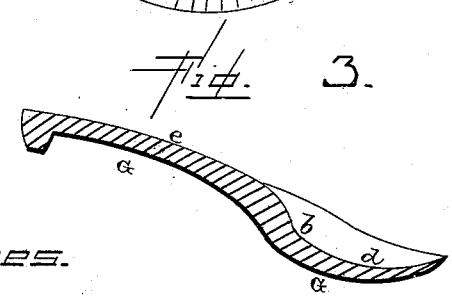

Figure 1 is a plan view of a machine embodying my invention. Fig. 2 is a detail perspective of the cutter-head and knives. Fig. 3 is a longitudinal section of a ladle, taken through the center of the handle. Fig. 4 is a vertical section of the cutter-head, taken through the knives. Fig. 5 is a front view of a portion of the carriage and the table, showing the manner in which the carriage slides upon the table.

In manufacturing the ladles I first cut out blocks of wood of a suitable thickness, length, and shape, and which are secured in the reciprocating carriage A by means of the set-screws G. The cutter-head B consists of the convex portion L, which is provided with the knife C, for forming the bowl of the ladle, the concave M, provided with the knife D, for forming the top of the handle, and the rim N, to which the bifurcated ends of the shaft E are secured. The cutter-head B is secured to the end of the shaft E, which shaft is supported in suitable bearings and provided with the pulley F, from which, by means of a belt, it receives a rotary motion. The end of the shaft E is preferably bifurcated, and has its two ends to extend near the outer edge of the cutter-head and secured thereto. By this means sufficient space is left for the easy and ready adjustment of the knives C D, which are provided with slots H and screws I, so that they can be adjusted as they wear, or to cut shallow or deep, as may be desired. The cutter-head B is preferably hollowed out upon its inner side, so as to reduce its thickness and allow the ready passage of shavings through the slots in which the knives are placed.

The knife C is provided with the convex portion $a$, which cuts out the ladle at $b$, and the nearly-straight portion $c$, which cuts the ladle at $d$. The knife D is made slightly concaved its entire length and cuts the top of the handle $e$ at the same time that the bowl is being cut. The two knives C D are placed, preferably, upon opposite sides of the cutter-head, so that but one knife is cutting at a time, thus requiring less power to revolve the cutter-head, and also prevents the weakening of the cutter-head, which would be the case were they placed continuously in the cutter-head. The cutter-head is made to conform approximately to the shape of the knives.

The carriage A is placed upon a suitable supporting-frame, J, said frame and carriage having the ordinary tongue and groove, in which it freely slides back and forth in relation to the cutter-head. The carriage is placed at an angle to the cutter-head, as shown, in order to bring the block from which the ladles are to be formed in the proper relation thereto. The blocks being secured in the carriage, it is only necessary to push the carriage to the cutter-knives, when the whole top of the bowl is formed in one operation.

The under side, G, of the bowl is formed in the ordinary manner, and which mechanism I preferably place upon the opposite end of the shaft E.

Having thus described my invention, I claim—

1. A cutter-head for forming ladles, placed upon the end of a shaft and having the knife C, consisting of the convex portion $a$ and the approximately-straight portion $c$, for shaping the bowl of a ladle, and the knife D, approximately concaved its entire length for shaping the upper side of the handle, and a reciprocating carriage placed at an angle thereto, and which carries the block from which the ladle is to be formed, substantially as set forth.

2. In a machine for forming ladles, the combination, with the head B, carrying knife C, for cutting the bowl of the ladle, and the knife D, for cutting the upper side of the handle, of the reciprocating carriage A, which is placed at an angle thereto, and in which the block from which the ladle is formed is placed, substantially as and for the purpose described.

3. A cutter-head placed upon the end of a shaft, consisting of a convex portion provided with a knife for cutting the bowl of a ladle and a concave portion provided with a knife for cutting the upper side of its handle, and a reciprocating carriage which carries the block to be acted upon by the cutters, the carriage being placed at an angle approximately parallel with the sectional shape of the cutter-head, substantially as shown and described.

In testimony whereof I affix my signature in presence of two witnesses.

ISAAC HAMILTON.

Witnesses:
WILLIAM F. DU BOIS,
GEO. K. HAMILTON.